(12) United States Patent
Hoffstein et al.

(10) Patent No.: US 9,634,840 B2
(45) Date of Patent: Apr. 25, 2017

(54) DIGITAL SIGNATURE TECHNIQUE

(71) Applicant: Security Innovation Inc., Willimington, MA (US)

(72) Inventors: Jeffrey Hoffstein, Providence, RI (US); John M Schanck, Somerville, MA (US); Joseph H Silverman, Needham, MA (US); William J Whyte, Belmont, MA (US)

(73) Assignee: Security Innovation Inc., Wilmington, MA (US)

( * ) Notice: Subject to any disclaimer, the term of this patent is extended or adjusted under 35 U.S.C. 154(b) by 0 days.

(21) Appl. No.: 14/121,041

(22) Filed: Jul. 22, 2014

(65) Prior Publication Data
US 2015/0033025 A1    Jan. 29, 2015

Related U.S. Application Data

(60) Provisional application No. 61/958,221, filed on Jul. 23, 2013.

(51) Int. Cl.
*H04L 9/32* (2006.01)
*H04L 9/30* (2006.01)

(52) U.S. Cl.
CPC .......... *H04L 9/3247* (2013.01); *H04L 9/3026* (2013.01)

(58) Field of Classification Search
USPC ....................................................... 713/176
See application file for complete search history.

(56) References Cited

U.S. PATENT DOCUMENTS 6,076,163 A * 6/2000 Hoffstein ............... H04L 9/3271
380/28
6,081,597 A * 6/2000 Hoffstein ............... H04L 9/3093
380/28

(Continued)

OTHER PUBLICATIONS

Hoffstein, J., Silverman, J.H.: Polynomial Rings and Efficient Public Key Authentication II. In: Lam, K.Y., Shparlikski, I., Wang, H., Xing, C. (eds.), Cryptography and Computational Number Theory, Progress in Computer Science and Applied Logic, vol. 20, pp. 269-286, Birkhauser (2001).

(Continued)

*Primary Examiner* — Farid Homayounmehr
*Assistant Examiner* — Thanh T Le
(74) *Attorney, Agent, or Firm* — Martin Novack

(57) ABSTRACT

A method for signing a digital message, including the following steps: selecting parameters that include first and second primes, a ring of polynomials related to the primes, and at least one range-defining integer; deriving private and public keys respectively related to a random polynomial private key of the ring of polynomials, and to evaluations of roots of unity of the random polynomial to obtain a public key set of integers; storing the private key and publishing the public key; signing the digital message by: (A) generating a noise polynomial, (B) deriving a candidate signature by obtaining a hash of the digital message and the public key evaluated at the noise polynomial, and determining the candidate signature using the private key, a polynomial derived from the hash, and the noise polynomial, (C) determining whether the coefficients of the candidate signature are in a predetermined range dependent on the at least one range-defining integer, and (D) repeating steps (A) through (C) until the criterion of step (C) is satisfied, and outputting the resultant candidate signature as an encoded signed message.

9 Claims, 5 Drawing Sheets

(56) References Cited

U.S. PATENT DOCUMENTS

| | | | | |
|---|---|---|---|---|
| 6,298,137 | B1 | 10/2001 | Hoffstein | 380/30 |
| 6,959,085 | B1* | 10/2005 | Hoffstein | H04L 9/008 380/2 |
| 7,308,097 | B2 | 12/2007 | Hoffstein | 380/28 |
| 7,913,088 | B2 | 3/2011 | Hoffstein | 713/180 |
| 2004/0151309 | A1* | 8/2004 | Gentry | H04L 9/3281 380/30 |
| 2004/0223616 | A1* | 11/2004 | Kocarev | H04L 9/001 380/263 |
| 2008/0037776 | A1* | 2/2008 | Akiyama | H04L 9/3093 380/44 |
| 2009/0010428 | A1* | 1/2009 | Delgosha | H04L 9/3093 380/30 |
| 2010/0046746 | A1* | 2/2010 | Yonemura | H04L 9/3033 380/30 |
| 2011/0060903 | A1* | 3/2011 | Yoshida | H04L 9/302 713/155 |
| 2013/0326215 | A1* | 12/2013 | Leggette | G06F 17/3023 713/156 |
| 2014/0136843 | A1* | 5/2014 | Sakumoto | H04L 9/3093 713/168 |
| 2015/0229478 | A1* | 8/2015 | Hoffstein | H04L 9/3247 713/176 |

OTHER PUBLICATIONS

Lyubashevsky, V., Fiat-Shamir With Aborts, Applications to Lattice and Factoring-Based Signatures, In: ASIACRYPT 2009, pp. 598-616. Springer (2009).

Gentry, C., Peikert, C., Vaikuntanathan, V.: How to Use a Short Basis: Trapdoors for Hard Lattices and New Cryptographic Constructions. In: Proceedings of the 40th Annual ACM Symposium on Theory of Computing. pp. 197-206. STPC 2008, ACM (2008).

Lyubashevsky, V.: Lattice-Based Identification Schemes Secure Under Active Attacks. In: Cramer, R. (ed.) PKC 2008, LNCS, vol. 4939, pp. 162-179. Springer (2008).

Lyubashevsky, V., Micciancio, D.: Generalized Compact Knapsacks Are Collision Resistant. In: Bugliesi, M., Preneel, B., Sassone, V., Wegener, I. (eds.) Automata, Languages and Programming, LNCS, vol. 4052, pp. 144-155. Springer (2006).

Güneysu, T., Lyubashevsky, V., Pöppelmann, T.: Practical Lattice Based Cryptography: A Signature Scheme for Embedded Systems. In: Prouff, E., Schaumont, P. (eds.) CHES 2012, LNCS, vol. 7428, pp. 530-547. Springer (2012).

Ducas, L., Durmus, A., Lepoint, T., Lyubashevsky, V.: Lattice Signatures and Bimodal Gaussians. In: Canetti, R., Garay, J.A. (eds.) CRYPTO 2013, LNCS, vol. 8042, pp. 40-56. Springer (2013).

* cited by examiner

DIGITAL SIGNATURE TECHNIQUE

RELATED APPLICATION

This application claims priority from U.S. Provisional Patent Application No. 61/958,221 filed Jul. 23, 2013, and said Provisional patent application is incorporated herein by reference.

FIELD OF THE INVENTION

This invention relates to the field of cryptography and, more particularly, to a public key digital signature technique.

BACKGROUND OF THE INVENTION

Public key digital signatures are important for secure exchange of information between plural parties, for example between computers or mobile devices, or between a smart card and a terminal.

In the late 1990s two of the inventors hereof proposed authentication and signature schemes based on the problem of recovering a polynomial with tightly concentrated coefficients given a small number of evaluations of that polynomial. The heuristic justification for the security of the scheme was that the uncertainty principle severely restricts how concentrated a signal can be in two mutually incoherent bases.

An early incarnation of that scheme is described in U.S. Pat. No. 6,076,163. and a later version, called PASS-2 was described in Hoffstein, J., Silverman, J. H.: Polynomial Rings and Efficient Public Key Authentication II. In: Lam, K. Y., Shparlikski, I., Wang, H., Xing, C. (eds.), Cryptography and Computational Number Theory, Progress in Computer Science and Applied Logic, vol. 20, pp. 269-286, Birkhauser (2001). A summary description of the PASS-2 technique is included as part of the attached Appendix I. The original PASS protocols, which are also described in Appendix I, include the following: Given a message $\mu$, a secret key f with small norm, and a public key $fl_\Omega = \hat{T}_\Omega f$, equal to the evaluations of f at the values contained in the set $\Omega$, the objective is to construct a signature that mixes f and $\mu$ and can be verified by means of $fl_\Omega$. A prototype of this was presented in the above-referenced U.S. Pat. No. 6,076,163.

To sign, the signer

Computes and keeps secret a short polynomial $g \in R_q$ and reveals the commitment $\hat{g}/_\Omega = \hat{F}_\Omega g$.

Computes and reveals a short challenge polynomial $c \in R_q$ from $\text{Hash}(\hat{g} l_\Omega, \mu)$.

Computes and reveals $h = g*(f+c)$.

To verify, the verifier

Verifies that h has norm less than a specific upper bound.

Verifies that $c = \text{Hash}(\hat{h} l_\Omega/(fl_\Omega + \hat{c} l_\Omega), \mu)$ The first condition for verification is met because $$|g*(f+c)| \approx |g||f+c|.$$

The fact that $|f|, |g|, |c|$ are small thus implies that $|h|$ is small. The second condition is true because $\mathcal{F}_\Omega$ is a ring homomorphism.

To forge a signature, a third party would need to produce an h which is short, and which satisfies the required evaluations at points in $\Omega$. It is conjectured that finding such an h is no easier than solving the associated closest vector problem.

The difficulty with this PASS prototype is that a transcript of signatures produced by a single signer on any set of messages leaks information about that signer's secret key. This is explained further in Appendix I.

The problem with PASS was not that individual signatures leaked information about the secret key, but rather that an average over a collection of signatures would converge to a secret key dependent value.

It is among the objects of the present invention to address and solve this type of vulnerability in certain public key digital signature techniques.

SUMMARY OF THE INVENTION

In accordance with an aspect of an embodiment of the invention, a PASS type of digital signature technique is devised which employs rejection sampling that assures that transcript distributions are completely decoupled from the keys that generate them. Background rejection sampling is described, for example, in Lyubashevsky, V., Fiat-Shamir With Aborts, Applications to Lattice and Factoring-Based Signatures, In: ASIACRYPT 2009, pp. 598-616. Springer (2009).

In accordance with an embodiment of the invention, a method is set forth for signing and subsequently verifying a digital message, including the following steps implemented using at least one processor-based subsystem: selecting parameters that include first and second primes, a ring of polynomials related to said primes, and at least one range-defining integer; deriving private and public keys respectively related to a random polynomial private key of the ring of polynomials, and to evaluations of roots of unity of the random polynomial to obtain a public key set of integers; storing the private key and publishing the public key; signing the digital message by: (A) generating a noise polynomial, (B) deriving a candidate signature by obtaining a hash of the digital message and the public key evaluated at the noise polynomial, and determining the candidate signature using the private key, a polynomial derived from the hash, and the noise polynomial, (C) determining whether the coefficients of the candidate signature are in a predetermined range dependent on said at least one range-defining integer, and (D) repeating steps (A) through (C) until the criterion of step (C) is satisfied, and outputting the resultant candidate signature as an encoded signed message; and performing a verification procedure utilizing the encoded signed message and the public key to determine whether the encoded signed message is valid.

In a disclosed embodiment of the invention, said step of selecting parameters that include at least one range-defining integer comprises selecting parameters that include first and second range-defining integers, and the step (C) of said signing of the digital message comprises determining whether the coefficients of the candidate signature are in a predetermined range dependent on said first and second range-defining integers. In this embodiment, the first and second range-defining integers define norm bound ranges, and the step of determining whether the coefficients of the candidate signature are in a predetermined range comprises determining whether said coefficients are within a range that is dependent on the norm bound ranges.

Further features and advantages of the invention will become more readily apparent from the following detailed description when taken in conjunction with the accompanying drawings.

DETAILED DESCRIPTION

Figure 1:
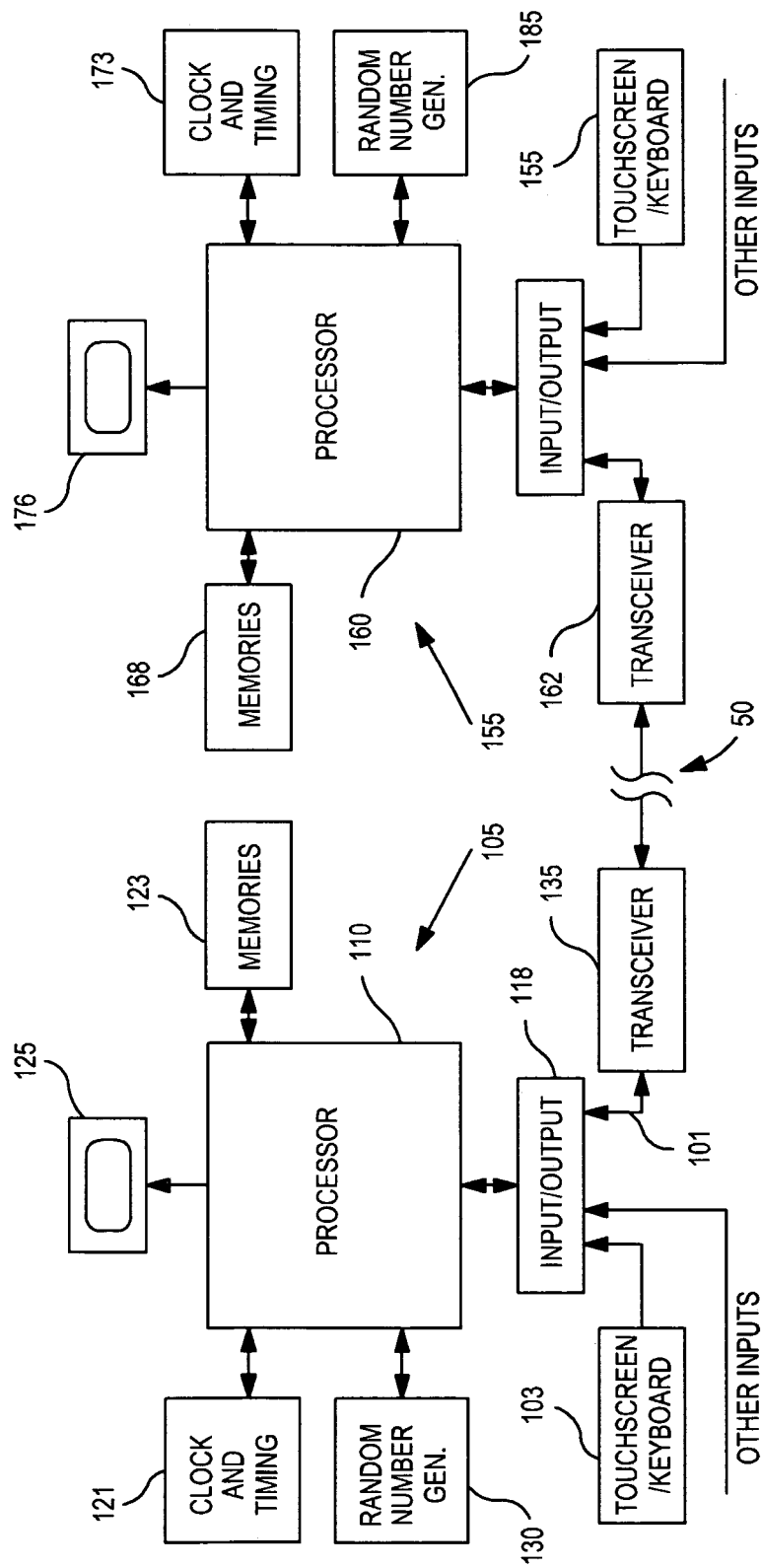
FIG. 1 is a block diagram of a system that can be used in practicing embodiments of the invention.

FIG. 1 is a block diagram of a system that can be used in practicing embodiments of the invention. Two processor-based subsystems 105 and 155 are shown as being in communication over an insecure channel 50, which may be, for example, any wired or wireless communication channel such as a telephone or internet communication channel. The subsystem 105 includes processor 110 and the subsystem 155 includes processor 160. The subsystems can typically comprise mobile devices, computers, or terminals. When programmed in the manner to be described, the processors 110 and 160 and their associated circuits can be used to implement an embodiment of the invention and to practice an embodiment of the method of the invention. The processors 110 and 160 may each be any suitable processor, for example an electronic digital processor or microprocessor. It will be understood that any general purpose or special purpose processor, or other machine or circuitry that can perform the functions described herein, electronically, optically, or by other means, can be utilized. The subsystem 105 will typically include memories 123, clock and timing circuitry 121, input/output functions 118 and display 125, which may all be of conventional types. Inputs can include a touchscreen/keyboard input as represented at 103. Communication is via transceiver 135, which may comprise a modem or any suitable device for communicating signals.

The subsystem 155 in this illustrative embodiment can have a similar configuration to that of subsystem 105. The processor 160 has associated input/output circuitry 164, memories 168, clock and timing circuitry 173, and a display 176. Inputs include a touchscreen/keyboard 155. Communication of subsystem 155 with the outside world is via transceiver 162 which, again, may comprise a modem or any suitable device for communicating signals.

Figure 2:
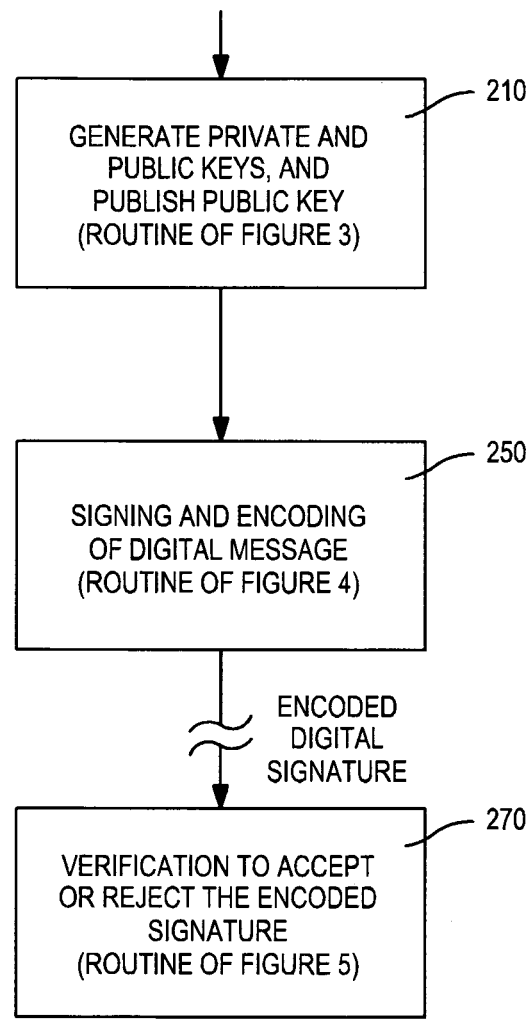
FIG. 2 is a flow diagram of a public key digital signature technique which, when taken with the subsidiary flow diagrams referred to therein, can be used in implementing embodiments of the invention.

FIG. 2 illustrates a basic procedure that can be utilized with a public key digital signature technique, and refers to routines illustrated by other referenced flow diagrams which describe features in accordance with an embodiment of the invention. Reference can also be made to Appendix I for further details of the invention. The block 210 represents the generating of the public key and private key signals and data, and the publishing of the public key. The routine of an embodiment thereof is described in conjunction with the flow diagram of FIG. 3. In the present example, this operation can be performed, for example, at the processor-based subsystem 105 of FIG. 1. The public key information can be published; that is, made available to any member of the public or to any desired group from whom the private key holder desires to receive the digital signatures. Typically, although not necessarily, the public key may be made available at a central public key library facility or website where a directory of public key holders and their public keys are maintained.

The block 250 represents a routine that can be employed (that is, in this example, by the user of processor-based subsystem 155 of FIG. 1) for signing and encoding the digital message. This routine, in accordance with an embodiment of the invention, is described in conjunction with the flow diagram of FIG. 4. In this example, the encoded digital signature is then transmitted over the channel 50 (FIG. 1).

The block 270 represents a routine that can be employed (that is, in this example, by the user of processor-based subsystem 155 of FIG. 1) for using, inter alia, the public key to implement a verification procedure to either accept or reject the encoded signature. This routine, in accordance with an embodiment of the invention, is described in conjunction with the flow diagram of FIG. 5.

Figure 3:
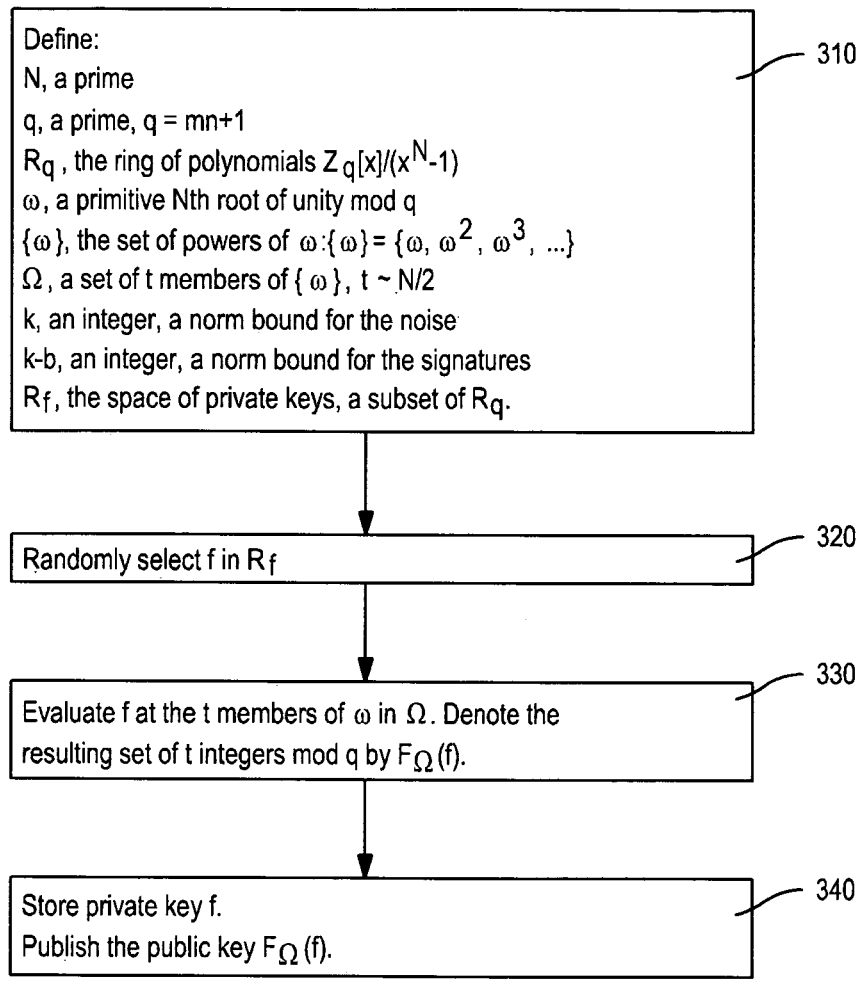
FIG. 3 is a flow diagram, in accordance with an embodiment hereof, of a routine for key generation.

FIG. 3 is a flow diagram of a routine, represented by the block 210 of FIG. 2, in accordance with an embodiment of the invention, for implementing key generation. Reference can also be made to Appendix I. The block 310 represents the inputting of parameters used in key generation, which include: primes N and q, (with N being the dimension for polynomials of degree N−1 and having N ordered coefficients, q=mN+1, and q>>N); Rq, the ring of polynomials $Z_q[x]/(x^N-1)$; w, a primitive $N^{th}$ root of unity modulo q; $\{\omega\}$ the set of powers of $\omega$, that is, $\{\omega\}=\{\omega, \omega^2, \omega^3, \ldots\}$; $\Omega$ a set of t members of ($\omega$), with t approximately N/2; k, an integer, which is a norm bound for the noise; k−b, an integer which is a norm bound for the signatures; and $R_f$, the space of private key polynomials, which is a subset of the ring of polynomials, $R_q$.

The block 320 represents the random selection of a polynomial f in the space $R_f$ of private keys. The polynomial f is the private key. Then, the block 330 represents generation of the public key, $F_\Omega(f)$. $F_\Omega(f)$ is obtained by evaluating the polynomial f at the t members of $\omega$ in $\Omega$. The block 340 represent the storing of the private key f and the publishing of the public key $F_\Omega(f)$.

Figure 4:
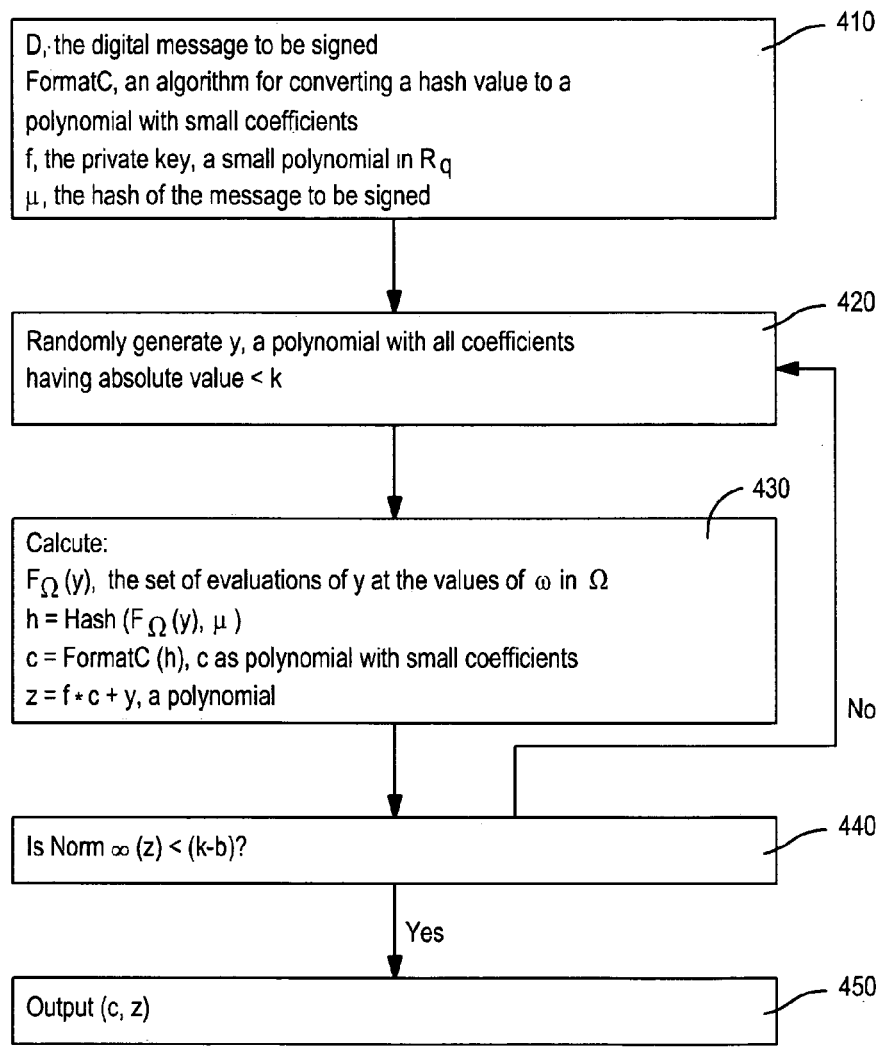
FIG. 4 is a flow diagram, in accordance with an embodiment hereof, of a routine for signing and encoding a digital message.

FIG. 4 is a flow diagram of a routine, represented by the block 250 of FIG. 2, in accordance with an embodiment of the invention, for implementing the signing and encoding of a digital message using, inter alia, the private key. Reference can also be made to Appendix I.

Referring to FIG. 4, the block 410 represents the inputting of D, the digital message to be signed, μ, a hash of the digital message D to be signed, and an algorithm called FormatC, which can be used for converting a hash value to a polynomial with small coefficients. (Reference can be made to the above referenced U.S. Pat. No. 6,076,163 with regard to the function implemented by FormatC.) The block 420 represents the random generation of a noise polynomial (also called a commitment polynomial), designated y, with all coefficients having absolute value less than k. Then, the block 430 represents the generation of the hash h, the polynomial c, and the polynomial z. Specifically, the hash h is obtained by applying a hash function to the public key $F_\Omega(y)$ and μ which is the hash of the digital message D. The algorithm FormatC is then applied to h to obtain c, a polynomial with small coefficients. The polynomial z, which is a candidate digital signature, is then obtained from z=f·c+y.

The decision block 440 represents the step of determining whether the coefficients of the candidate signature are in a predetermined range, dependent on range-defining integers. In this embodiment, a determination is made of whether Norm$_\infty$(z) is less than (k−b). If not, the block 420 is re-entered, and the process steps of blocks 420, 430 and 440 are repeated until a candidate digital signature which meets the criterion of block 440 is obtained. The block 450 is then entered, this block representing the outputting of the qualifying candidate signature, that is, the encoded signed message z. Typically the polynomial c, used in obtaining z (or the hash h, from which c can be derived) is also output.

Figure 5:
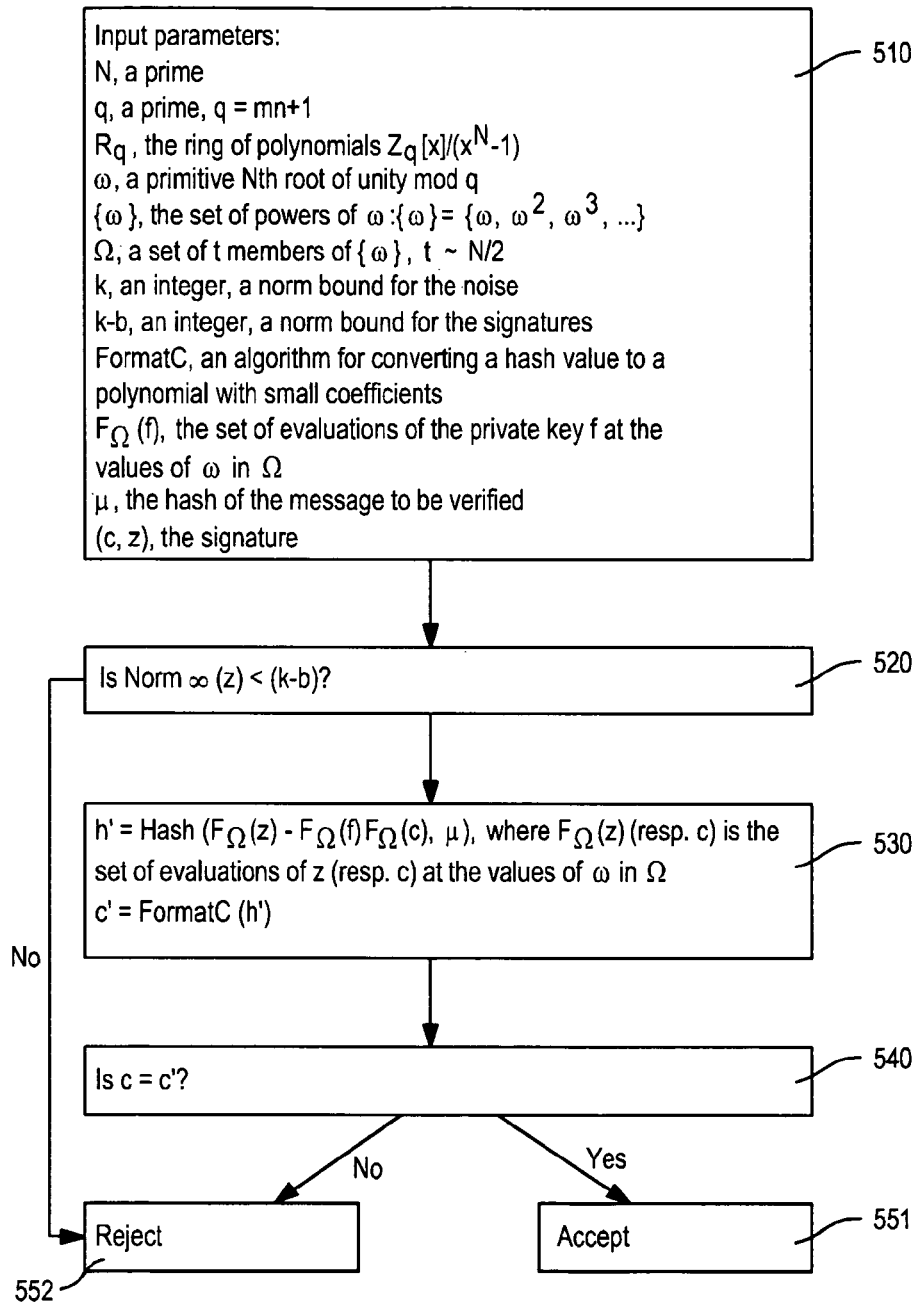
FIG. 5 is a flow diagram, in accordance with an embodiment hereof, of a routine for verification of an encoded digital signature.

FIG. 5 is a flow diagram of a routine, represented by the block 270 of FIG. 2, in accordance with an embodiment of the invention, for implementing verification of whether the received encoded signed message is valid. Reference can also be made to Appendix I.

The block 510 represents the inputting of parameters that include the encoded signed message (c, z), the hash (p) of the message to be verified and the public key $F_\Omega(f)$. Typically, the other listed input parameters are also made available; that is: N, q, $R_q$ ω, {ω} Ω, k, (k−b), and FormatC, as previously described.

In FIG. 5, as represented by the block 520, the verifier first checks that the encoded signature polynomial has coefficients in the correct range; that is, for this embodiment, determines whether Norm$_\infty$(z)<(k−b). If not, the encoded signature is rejected. If so, however, the verification routine continues, using the public key $F_\Omega(f)$. The polynomial z is evaluated to obtain $F_\Omega(z)$. Since $F_\Omega$ is a ring homomorphism, we have that $F_\Omega(z)=F_\Omega(f) \; F_\Omega(c)+F_\Omega(y)$, and the verifier can determine $F_\Omega(y)$ by subtracting the component-wise product of $F_\Omega(f)$ and $F_\Omega(c)$ from $F_\Omega(z)$. The signature is then valid if any only if the hash of $F_\Omega(y)$ along with p (the hash of the message D) is equal to the received hash value h (or, equivalently, for our purposes, if the short polynomials derived from the respective hashes (e.g. using FormatC) are equal. As represented block 530 of the FIG. 5 embodiment, h' is the hash of ($F_\Omega(z)-F_\Omega(f) \; F_\Omega(c)$, μ) where $F_\Omega(z)$ (resp. c) is the set of evaluations of z (resp. c) at the values of ω in Ω, and c' is the short polynomial to which h' is converted using FormatC (that is, c'=FormatC(h')). Then if c=c' (block 540), the encoded signature is accepted (block 551). If these quantities are unequal, the signature is rejected (block 552).

The invention has been described with reference to particular preferred embodiments, but variations within the spirit and scope of the invention will occur to those skilled in the art. For example, while a digital signature technique has been described, it will be understood that an authentication producer of the challenge-response-verification type can alternatively be implemented, using the technique hereof by using the challenge as the message to be signed.

Appendix I

Practical Signatures from the Partial Fourier Recovery Problem

Jeff Hoffstein[1], Jill Pipher[1], John M. Schanck[2], Joseph H. Silverman[1], and William Whyte[2]

[1] Brown University, Providence, RI, 02912
{jhoff,jpipher,jhs}@math.brown.edu
[2] Security Innovation, Wilmington, MA 01887
{jschanck,wwhyte}@securityinnovation.com

Abstract. We present $PASS_{RS}$, a variant of the prior PASS and PASS-2 proposals, as a candidate for a practical post-quantum signature scheme. Its hardness is based on the problem of recovering a ring element with small norm from an incomplete description of its Chinese remainder representation. For our particular instantiation, this corresponds to the recovery of a vector with small infinity norm from a limited set of its Fourier coefficients.

The key improvement over previous versions of PASS is the introduction of a rejection sampling technique from Lyubashevsky (2009) which assures that transcript distributions are completely decoupled from the keys that generate them.

Although the scheme is not supported by a formal security reduction, we present extensive arguments for its security and derive concrete parameters based on the performance of state of the art lattice reduction and enumeration techniques.

1 Introduction

In the late 1990s two authors of the present paper proposed authentication and signature schemes based on the problem of recovering a polynomial with tightly concentrated coefficients given a small number of evaluations of that polynomial. The heuristic justification for the security of the scheme was that the uncertainty principle severely restricts how concentrated a signal can be in two mutually incoherent bases.

An early incarnation of the scheme is found in [12], and a later version, called PASS-2 was published in [13]. A rough description goes as follows. Let $N$ be a positive integer, and choose a prime $q = rN+1$, with $r \geq 1$. We will denote by $R_q$ the ring $\mathbb{Z}_q[x]/(x^N - 1)$, though we will often treat elements of $R_q$ as vectors in $\mathbb{Z}_q^N$ equipped with the $\star$-multiplication of $R_q$. To avoid confusion, we will denote component-wise multiplication of vectors by $\odot$. For any $\beta$, with $(\beta, q) = 1$, it follows from Fermat's little theorem that $\beta^{rN} \equiv 1 \pmod{q}$. Consequently, the mapping $f \to f(\beta^r)$ is well defined for any $f$ in $R_q$. In addition to being well defined, it is also a ring homomorphism, for the simple reason that for any $f_1, f_2 \in R_q$, $$(f_1 + f_2)(\beta^r) = f_1(\beta^r) + f_2(\beta^r) \quad \text{and} \quad (f_1 \star f_2)(\beta^r) = f_1(\beta^r) f_2(\beta^r).$$

More generally, for any $\Omega = \{\beta_1^r, \beta_2^r, \ldots, \beta_t^r\}$, the mapping $\mathcal{F} : R_q \to \mathbb{Z}_q^t$ given by $$\mathcal{F}_\Omega f = (f(\beta_1^r), f(\beta_2^r), \ldots, f(\beta_t^r))^T$$

is a ring homomorphism, with addition and $\odot$-multiplication modulo $q$ done on the right hand side. This is an example of the more general phenomenon of the ring homomorphism mapping functions to their Fourier transforms.

In the above setting, the uncertainty principle implies that a ring element with a coefficient vector drawn from a small region of $\mathbb{Z}_q^N$ will have widely dispersed discrete Fourier coefficients. For instance a vector with small infinity norm, e.g. with coefficients in $\{-1, 0, 1\}$, will likely be supported on all powers of a primitive $N^{th}$ root $\omega$ and will have Fourier coefficients which are essentially uniformly distributed in $\mathbb{Z}_q$.

The hard problem in PASS can be stated as the following underdetermined linear inversion problem, which we will refer to as the *partial Fourier recovery* problem. Let $\omega$ be a primitive $N^{th}$ root of unity modulo $q$. We define the discrete Fourier transform over $\mathbb{Z}_q$ to be the linear transformation $\mathcal{F}f = \widehat{f} : \mathbb{Z}_q^N \to \mathbb{Z}_q^N$ given by $$(\mathcal{F})_{i,j} = \omega^{ij}.$$

Furthermore, let $\mathcal{F}_\Omega$ be the restriction of $\mathcal{F}$ to the set of $t$ rows specified by an index set $\Omega$, $$(\mathcal{F}_\Omega)_{i,j} = \omega^{\Omega_i j}.$$

The partial Fourier recovery problem is: given an evaluation $\widehat{f}|_\Omega \in \mathbb{Z}_q^t$, find $x$ with small norm such that $\widehat{x}|_\Omega = \widehat{f}|_\Omega \pmod{q}$.

The problem of recovering a signal from a restricted number of its Fourier coefficients is well studied and known to be quite difficult in general. The restricted image $\widehat{f}|_\Omega$ is expected to contain very little information about the unobserved Fourier coefficients (the evaluations of $f$ on $\omega^i$ for $i$ not in $\Omega$), and often the only way to recover $f$ will be an expensive combinatorial optimization procedure. However, there are cases (some quite surprising) in which the problem is known to be easy.

Certainly, if $t \log q$ is small, brute force search over $f'$ with appropriate norm may be a viable solution – each randomly chosen candidate having essentially a $q^{-t}$ chance of evaluating to $\widehat{f}|_\Omega$.

The problem is trivial in the large $t$ regime, $t \geq N$, since any rank $N$ submatrix of the chosen Vandermonde matrix will be invertible. As $t$ decreases slightly below $N$, or we allow some portion of the coefficients to be corrupted, the problem essentially becomes that of decoding Reed-Solomon codes and we can expect to recover $f$ by list-decoding or similar techniques. Efficient recovery of general signals when $t$ is much less than $N$ would have significant coding theoretic implications.

For $t$ in an intermediate range, say $t \approx N/2$, the situation is more complicated. Were one to consider the complex Fourier transform rather than the number theoretic transform, one might be able to apply techniques from the field of compressed sensing. Recent work in this field has delineated cases in which a *sparse* signal can be recovered from a limited number of its (complex) Fourier coefficients by an $L^1$ optimization procedure. For this to be successful the signals must be very sparse, having a number of non-zero coefficients which is less than $|\Omega|/2$ [2]. It is not clear how these results translate into the finite field setting.

As far as we are aware, the best technique for solving the partial Fourier recovery problem is by solving an associated closest vector problem. Specifically, let $\Lambda^\perp(\mathcal{F}_\Omega)$ be the lattice of vectors in the kernel of $\mathcal{F}_\Omega$. That is, $$\Lambda^\perp(\mathcal{F}_\Omega) = \left\{ a \in \mathbb{Z}_q^N \ : \ \mathcal{F}_\Omega a = 0 \pmod{q} \right\}.$$

If, given $y \in \mathbb{Z}_q^N$, a point $x \in \Lambda^\perp(\mathcal{F}_\Omega)$ can be found such that $\|y - x\|_\infty \leq \beta$, then $\mathcal{F}_\Omega(y - x) = \widehat{y}|_\Omega$ and $\|y - x\|_\infty \leq \beta$. Since one can easily find (large) $y$ such that $\widehat{y}|_\Omega = \widehat{f}|_\Omega$ for any evaluation set $\widehat{f}|_\Omega$, the ability to solve CVP in $\Lambda^\perp(\mathcal{F}_\Omega)$ implies the ability to solve arbitrary partial Fourier recovery instances While there is no known reduction from standard lattice problems to the partial Fourier recovery problem, there is at very least a superficial relationship between finding short preimages of $\mathcal{F}_\Omega$ and another well studied hard problem. A great deal of the research in lattice based cryptography throughout the last decade has focused on a type of underdetermined linear inverse problem referred to as the small integer solution (SIS) problem.

SIS is the problem of of finding a vector $y$ in the kernel of a specified linear transformation $A : \mathbb{Z}_q^n \to \mathbb{Z}_q^m$ such that $y$ is small with respect to a given norm. That is, the goal is to solve $$Ay = 0 \pmod{q} \quad \text{and} \quad \|y\| \leq \beta.$$

Ajtai showed in [1] that, for certain parameters and uniform random $A$, SIS enjoys a remarkable average-case correspondence with worst-case lattice problems. That is to say that the ability to solve random SIS instances with non-negligible probability implies an ability to find short vectors in any lattice. This correspondence between worst and average cases is attractive from a provable security point of view, offering strong assurance that easy to generate instances of the SIS problem will be hard to solve, but it does not yield particularly efficient cryptosystems without additional assumptions.

The most efficient and compact SIS schemes in the literature are based on the Ideal-SIS problem, wherein the matrix $A$ is replaced by several uniform random elements, $a_1, a_2, \ldots a_k$ of a quotient ring $R_q^\varphi = \mathbb{Z}_q[x]/(\varphi)$. The polynomial $\varphi$ is typically, but not necessarily, cyclotomic. A solution to Ideal-SIS is $y_1, y_2, \ldots y_k$ in the ring such that:

$$\sum_{i=1}^{k} a_i \star y_i = 0 \quad \text{and} \quad \sum_{i=1}^{k} \|y_i\|^2 \leq \beta^2.$$

These schemes derive their security from the presumed hardness of Ideal-SVP – the shortest vector problem in the restricted class of lattices generated by matrix representations of elements of $R_q^\varphi$. Reductions from worst-case Ideal-SVP to average-case Ideal-SIS were presented in [17] [20]. Unfortunately, even with the reduced storage requirements and fast multiplication algorithms available in some rings, provably secure Ideal-SIS based constructions are still too inefficient to be competitive with existing (non-quantum resistant) schemes.

The security of PASS can be said to rest on the assumed average-case hardness of Vandermonde-SIS. We are not aware of any technique for reducing a worst-case lattice problem to Vandermonde-SIS, nor will we postulate the existence of such a reduction. We do however raise the question of whether there might be a characterization of hard instances of SIS which does not rely on structural properties of the matrix $A$. Or more generally, when is a constrained linear inverse problem hard?

We believe an answer to this problem would likely simultaneously explain the hardness of Uniform-, Ideal- and Vandermonde-SIS, as well as delineate new classes.

2 Related Work

2.1 The original PASS protocols

Given a (padded) message $\mu$, a secret key $f$ with small norm, and a public key $\widehat{f}|_\Omega = \mathcal{F}_\Omega f$, the objective is to construct a signature that mixes $f$ and $\mu$ and can be verified by means of $\widehat{f}|_\Omega$. A prototype of this was presented in [12].

To sign, Alice

- Computes and keeps secret a short polynomial $g \in R_q$ and reveals the commitment $\widehat{g}|_\Omega = \mathcal{F}_\Omega g$.
- Computes and reveals a short challenge polynomial $c \in R_q$ from $\mathsf{Hash}(\widehat{g}|_\Omega, \mu)$.
- Computes and reveals $h = g \star (f + c)$.

To verify, Bob

- Verifies that $h$ has norm less than a specific upper bound.
- Verifies that $c = \mathsf{Hash}(\widehat{h}|_\Omega/(\widehat{f}|_\Omega + \widehat{c}|_\Omega), \mu)$ The first condition for verification is met because $$\|g \star (f + c)\| \approx \|g\| \, \|f + c\|.$$

The fact that $\|f\|$, $\|g\|$, $\|c\|$ are small thus implies that $\|h\|$ is small[3]. The second condition is true because $\mathcal{F}_\Omega$ is a ring homomorphism.

To forge a signature, a third party would need to produce an $h$ which is short, and which satisfies the required evaluations at points in $\Omega$. It is conjectured that finding such an $h$ is no easier than solving the associated CVP .

2.2 Transcript weaknesses in previous PASS protocols

The difficulty with this PASS prototype is that a transcript of signatures produced by a single signer on any set of messages leaks information about that signer's secret key. One way to see this is via a ring homomorphism $\rho : R_q \to R_q$ given by $$\rho(a_0 + a_1 x + a_2 x^2 + \cdots + a_{N-1} x^{N-1}) = a_0 + a_{N-1} x + a_{N-2} x^2 + \cdots + a_1 x^{N-1}.$$

The homomorphism $\rho$ plays the same role that conjugation would play if $x$ were replaced by a primitive $N^{th}$ root of unity. If a polynomial $p \in R_q$ is drawn randomly from a distribution, let $\mathbb{E}[p]$ denote the expectation of $p$, that is, the average of $p$ over many samples. A third party observing many examples of $g \star (f + c)$ could compute $$\mathbb{E}[g \star (f + c) \star \rho(g \star (f + c))] = \mathbb{E}[g \star \rho(g)] \, \mathbb{E}[(f + c) \star \rho(f + c)]$$

For simplicity assume that $\mathbb{E}[c] = 0$, then, since $f$ is constant, the above becomes $$\mathbb{E}[g \star \rho(g)] \left( \mathbb{E}[c \star \rho(c)] + f \star \rho(f) \right).$$

The distributions from which $c$ and $g$ are drawn are known, and thus a sufficiently long transcript will reveal $f \star \rho(f)$ from which $f$ may be computed by a technique from Gentry and Szydlo [8].

2.3 Recent developments and countermeasures

The problem with PASS was not that individual signatures leaked information about the secret key, but rather that an average over a collection of signatures would converge to a secret key dependent value. This is not a concern for signature schemes based on number theoretic trapdoor permutations, as such schemes enjoy relatively simple proofs that their signatures are uniformly distributed over the full range of possibilities. However, the requirement that PASS signatures have small norm, i.e. that they occupy a small region of the full domain, necessitates throwing out much of the algebraic structure that makes such uniformity

---

[3] The original PASS protocol used the centered $L^2$ norm - the $L^2$ norm about the mean of the vector. This norm can be seen to enjoy the above quasi-multiplicative property for independent random polynomials by considering the product in the complex Fourier domain, noting that the centering operation has the effect of zeroing the constant terms, and by applying Parseval's theorem.

guarantees possible. Full decoupling of secret keys from transcripts was a difficult barrier for the construction of secure lattice based signature schemes, and more so for the construction of efficient schemes.

The first successful decoupling, the signature scheme of Gentry, Peikert, and Vaikuntanathan [7], involved computing a candidate signature point $x$ and then adding noise sampled from a discrete Gaussian distribution centered at $-x$. The resulting signatures have a distribution which is computationally indistinguishable from a spherical discrete Gaussian centered at the origin.

Lyubashevsky, in [14], constructed a lattice based identification scheme which avoids transcript analysis attacks with a technique he called "aborting." In this scheme, provers are capable of determining when their response to a challenge will leak information about their secret key. Whenever this occurs they abort the protocol rather than supply a response.

In [15], Lyubashevsky improved his aborting technique and constructed a signature scheme through the Fiat-Shamir transform with hardness based on the Ring-SIS problem. Improvements and variants of this scheme with different hardness assumptions were presented in [16].

The first truly practical lattice signature scheme to avoid transcript attacks was developed by Güneysu, Lyubashevsky, and Pöppelmann [9]. Their scheme is a highly optimized variant of [16] and relies on a stronger hardness assumption.

The current state of the art would appear to be the new scheme, called BLISS, by Ducas, Durmus, Lepoint, and Lyubashevsky [4]. This scheme makes use of an NTRU-like key generation procedure and a bimodal discrete Gaussian noise distribution to produce very compact signatures. The efficiency of the scheme is also very impressive, especially considering the complexity of sampling discrete Gaussians.

3 PASS$_{RS}$ – PASS with Rejection Sampling $N$ - Dimension
$q$ - Prime $\equiv 1 \pmod{N}$
$g$ - a primitive $N^{th}$ root of unity in $\mathbb{Z}_q$
$\Omega$ - A subset of $\{g^j : 1 \leq j \leq N-1\}$
$t$ - $|\Omega|$
$k$ - Infinity norm of noise polynomials
$b$ - 1-norm of challenge polynomials Table 1: Public parameters We now present PASS$_{RS}$ a new variant of PASS which completely decouples the transcript distribution from the secret key. Table 1 lists the public parameters of the system and gives a brief description of each.

Some notes on notation: $R_q$ is the ring $\mathbb{Z}_q[x]/(x^N - 1)$; elements $a \in R_q$ are represented as polynomials $a = a_0 + a_1 x + a_2 x^2 + \cdots + a_{N-1} x^{N-1}$, with coefficients in $a_i \in \mathbb{Z}_q$. We freely transition between this polynomial representation and a coefficient vector representation, $a = [a_0, a_1, a_2, \ldots, a_{N-1}]^T$, wherever convenient.

Norms, such as $\|a\|_\infty$ and $\|a\|_1$, are the standard $L^p$ norms on coefficient vectors; for numerical calculations we consistently identify $a_i$ with an integer such that $|a_i| \leq q/2$.

We write $\mathcal{B}^1(b)$ to denote the elements of $R_q$ with 1-norm $\leq b$, and $\mathcal{B}^\infty(k)$ to denote the elements of $R_q$ with $\infty$-norm $\leq k$.

Lastly, The indicator function $1_S(x)$ yields 1 if $x \in S$ and 0 otherwise.

3.1 Key Generation

A secret key is a polynomial with $L^\infty$ norm equal to 1. We recommend the simple strategy of choosing each coefficient independently and uniformly from $\{-1, 0, 1\}$. Binary coefficients, though attractive for several reasons, would open the system up to a UniqueSVP gap amplification attack similar to that used by Nguyen in his cryptanalysis of GGH [19].

The public key corresponding to the secret key $f$ is $\widehat{f}|_\Omega = \mathcal{F}_\Omega f$.

3.2 Signing

Signing is an iterated process consisting of the generation of a candidate signature followed by a rejection sampling step to prevent the publication of candidates that could leak secret key information.

A party with secret key $f$, who wishes to sign a message $\mu$, first selects a commitment polynomial $y$ uniformly at random from $\mathcal{B}^\infty(k)$. The commitment $y$ serves to mask the private key and must be treated with the same care as the private key itself. The signer then computes and stores $\widehat{y}|_\Omega = \mathcal{F}_\Omega y$, which will ultimately be made public if the candidate passes rejection sampling.[4]

Next, the signer computes a challenge, $c$, which binds $\widehat{y}|_\Omega$ to $\mu$. To do so she makes use of the public algorithms:

$$\text{Hash}: \mathbb{Z}_q^t \times \{0,1\}^* \to \{0,1\}^\ell, \text{ and}$$

$$\text{FormatC}: \{0,1\}^\ell \hookrightarrow \mathcal{B}^1(b).$$

Hash concatenates its inputs and passes the result through a cryptographic hash function such as SHA-512. FormatC maps the set of bitstrings output by Hash into a set of sparse polynomials. We avoid further description of the algorithms for now and simply say that $$c = \text{FormatC}(\text{Hash}(\widehat{y}|_\Omega, \mu)).$$

---

[4] Note that the generation of $y$ and the computation of $\widehat{y}|_\Omega$ can both be done offline, oblivious to the message to be signed.

Finally, the signer computes a candidate signature point $$z = f \star c + y \in R_q,$$

if any of the coefficients of $z$ fall outside the interval $[-k + b, k - b]$, then $y$, $c$, and $z$ are discarded and the signing process is repeated. Otherwise, the signer outputs the signature $(c, z, \mu)$.

In section 4 we will prove that signatures that pass the rejection sampling procedure have $z$ values that are uniformly distributed over $\mathcal{B}^\infty(k - b)$.

3.3 Verification

The signature $(c, z, \mu)$ is valid if $z$ is in $\mathcal{B}^\infty(k - b)$ and if $$c = \mathsf{FormatC}(\mathsf{Hash}(\hat{z}|_\Omega - \hat{f}|_\Omega \odot \hat{c}|_\Omega, \mu)).$$

Since $\mathcal{F}_\Omega$ is a ring homomorphism, it is the case that $\hat{z}|_\Omega = \hat{f}|_\Omega \odot \hat{c}|_\Omega + \hat{y}|_\Omega$. Therefore, on receipt of $(c, z, \mu)$, any verifier in possession of the appropriate public key $\hat{f}|_\Omega$ can evaluate $z$ and $c$ and compute $\hat{y}|_\Omega = \hat{z}|_\Omega - \hat{f}|_\Omega \odot \hat{c}|_\Omega$. The correctness of the scheme is immediate.

| Algorithm 1 Sign | Algorithm 2 Verify |
|---|---|
| Input: $(\mu, f)$ | Input: $(c, z, \mu, \hat{f}|_\Omega)$ |
| 1: repeat | 1: $result \leftarrow$ invalid |
| 2: $\quad y \xleftarrow{\$} \mathcal{B}^\infty(k)$ | 2: if $z \in \mathcal{B}^\infty(k - b)$ then |
| 3: $\quad h \leftarrow \mathsf{Hash}(\hat{y}|_\Omega, \mu)$ | 3: $\quad h' \leftarrow \mathsf{Hash}(\hat{z}|_\Omega - \hat{f}|_\Omega \odot \hat{c}|_\Omega, \mu)$ |
| 4: $\quad c \leftarrow \mathsf{FormatC}(h)$ | 4: $\quad c' \leftarrow \mathsf{FormatC}(h')$ |
| 5: $\quad z \leftarrow f \star c + y$ | 5: $\quad$ if $c = c'$ then |
| 6: until $z \in \mathcal{B}^\infty(k - b)$ | 6: $\quad\quad result \leftarrow$ valid |
| Output: $(c, z, \mu)$ | 7: $\quad$ end if |
| | 8: end if |
| | Output: $result$ |

4 Rejection Sampling

Each iteration of the signature generation routine produces a candidate signature which is accepted or rejected based on its infinity norm alone. In this section we will argue that this rejection sampling procedure completely decouples the distribution of signature points from the private key.

We will make use of the following fact:

Fact 1 *Each candidate signature $z$ is in $\mathcal{B}^\infty(k + b)$.*

*Proof.* By definition we have $\|z\|_\infty = \|f \star c + y\|_\infty$ and by the triangle inequality: $\|f \star c + y\|_\infty \leq \|f \star c\|_\infty + \|y\|_\infty$. Again by the triangle inequality, $\|f \star c\|_\infty \leq \|f\|_\infty \|c\|_1$, thus $$\|z\|_\infty \leq \|f\|_\infty \|c\|_1 + \|y\|_\infty \leq b + k.$$

We will also make use of the following assumption on instantiations of Hash and FormatC.

Assumption 1 *Let the public parameters* $(N, q, k, b, \Omega)$ *be fixed and let* $c \in \mathcal{B}^1(b)$, $y \in \mathcal{B}^\infty(k)$, $\mu \in \{0,1\}^*$ *be random variables related by*

$$c = \mathsf{FormatC}(\mathsf{Hash}(\widehat{y}|_\Omega, \mu)).$$

*We assume that* Hash *is a collision resistant hash function, that* $c$ *and* $y$ *are independent, and that* $c$ *is uniform over the range of* FormatC. *More explicitly, for any fixed* $c_0 \in \mathcal{B}^1(b)$ *and fixed* $y_0 \in \mathcal{B}^\infty(k)$, $$\Pr[c = c_0 \mid y = y_0] = \frac{\Pr[c = c_0]\Pr[y = y_0]}{\Pr[y = y_0]} = |\mathcal{B}^1(b)|^{-1}.$$

Note that assumption 1 is no stronger than the standard random oracle assumption, so the reader may assume we are working in the random oracle model. We state the assumption in the above form to aid in the analysis of concrete instantiations. Clearly the assumption that the joint distribution of $y$ and $c$ factors is untenable - no deterministic instantiation of Hash can satisfy it while maintaining collision resistance. Yet by choosing an appropriate padding scheme for $\mu$ one should be able to approximately satisfy the assumption. We leave the exploration of padding schemes and analysis of the practical impact of assumption 1 to future work.

The following proposition describes the distribution of candidate signatures.

Proposition 1. *Fix vectors* $f_0 \in \mathcal{B}^\infty(1)$ *and* $z_0 \in \mathcal{B}^\infty(k+b)$. *Then as the pair* $(c, y)$ *is chosen uniformly from the space* $\mathcal{B}^1(1) \times \mathcal{B}^\infty(k)$, *we have*

$$\Pr[f_0 \star c + y = z_0] = |\mathcal{B}^\infty(k)|^{-1} \sum_{c_0 \in \mathcal{B}^1(b)} \Pr[c = c_0] \mathbf{1}_{\mathcal{B}^\infty(k)}(z_0 - f_0 \star c_0).$$

*Proof.* For any fixed $c_0 \in \mathcal{B}^1(b)$ we have $$\Pr[f_0 \star c_0 + y = z_0] = \Pr[y = z_0 - f_0 \star c_0]$$

$$= \begin{cases} |\mathcal{B}^\infty(k)|^{-1} & \text{if } (z_0 - f_0 \star c_0) \in \mathcal{B}^\infty(k) \\ 0 & \text{otherwise.} \end{cases}$$

By application of the law of total probability and the assumption that the $c$ and $y$ are independent:

$$\Pr[f_0 \star c + y = z_0] = \sum_{c_0 \in \mathcal{B}^1(b)} \Pr[c = c_0]\Pr[f_0 \star c + y = z_0 \mid c = c_0]$$

$$= \sum_{c_0 \in \mathcal{B}^1(b)} \Pr[c = c_0]\Pr[y = z_0 - f_0 \star c_0]$$

$$= |\mathcal{B}^\infty(k)|^{-1} \sum_{c_0 \in \mathcal{B}^1(b)} \Pr[c = c_0] \mathbf{1}_{\mathcal{B}^\infty(k)}(z_0 - f_0 \star c_0).$$

Recall from section 3.2 that a candidate signature is rejected unless its $z$ component is contained in $\mathcal{B}^\infty(k-b)$. The following proposition shows that each point in $\mathcal{B}^\infty(k-b)$ is selected as a candidate signature with equal probability.

Proposition 2. *Fix vectors $f_0$ in $\mathcal{B}^\infty(1)$ and $z_0$ in $\mathcal{B}^\infty(k-b)$. Then as the pair $(c, y)$ is chosen uniformly from the space $\mathcal{B}^1(b) \times \mathcal{B}^\infty(k)$, we have*

$$\Pr[f_0 \star c + y = z_0] = |\mathcal{B}^\infty(k)|^{-1}.$$

*Proof.* We first note that $\mathcal{B}^\infty(k-b)$ is contained within $\mathcal{B}^\infty(k+b)$, so proposition 1 applies. Additionally, it is the case that $\|z_0\|_\infty \leq k - b$ and consequently, for any fixed $c_0 \in \mathcal{B}^1(b)$, we have $\|z_0 - f_0 \star c_0\|_\infty \leq k$. Thus $z_0 - f_0 \star c_0$ is contained in $\mathcal{B}^\infty(k)$ and the indicator function in proposition 1 is unconditionally satisfied. Therefore, $$\Pr[f_0 \star c + y = z_0] = |\mathcal{B}^\infty(k)|^{-1} \sum_{c_0 \in \mathcal{B}^1(b)} \Pr[c = c_0] = |\mathcal{B}^\infty(k)|^{-1}.$$

Proposition 2 informs us that each of the $|\mathcal{B}^\infty(k-b)|$ acceptable signature points is chosen with probability $|\mathcal{B}^\infty(k)|^{-1}$. We infer that each pass through the signature generation routine has probability $$\Pr[accept] = \frac{|\mathcal{B}^\infty(k-b)|}{|\mathcal{B}^\infty(k)|} = \left(1 - \frac{2b}{2k+1}\right)^N \approx e^{-\frac{Nb}{k}}$$

of generating a valid signature point, where the approximation is valid provided that both $N$ and $k/b$ are large.

A *transcript* is a set of signatures published by an honest signer. For instance, a signer who uses private key $f$ to sign messages $\mu_1, \mu_2, \ldots, \mu_k$ produces a transcript $$T = \{(c_i, z_i) : (c_i, z_i, \mu_i) = \mathsf{Sign}(\mu_i, f)\}.$$

Proposition 3. *A transcript $T$ generated by an honest signer with private key $f$ is indistinguishable from a set of points drawn uniformly from $\mathcal{B}^1(b) \times \mathcal{B}^\infty(k-b)$. Furthermore, for any fixed $c_0 \in \mathcal{B}^1(b)$, $z_0 \in \mathcal{B}^\infty(k-b)$ and $f_0 \in \mathcal{B}^1(1)$, the events $(c_0, z_0) \in T$ and $f = f_0$ are independent.*

*Proof.* The $c$ components of $T$ are uniformly distributed over $\mathcal{B}^1(b)$ by assumption 1. Proposition 2 establishes not only that the $z$ components of $T$ are uniformly distributed over $\mathcal{B}^\infty(k-b)$, but also that the distribution of $z$ depends *only* on the distribution of $y$. Again by assumption 1, $c$ and $y$ are independent and therefore $c$ and $z$ are independent. The distribution of transcript points is consequently the product distribution of $c$ and $z$, i.e. uniform over $\mathcal{B}^1(b) \times \mathcal{B}^\infty(k-b)$.

Independence of transcript points from the secret key follows from the fact that proposition 2 holds for all choices of $f_0$ in $\mathcal{B}^\infty(1)$.

5 Security Analysis

Our security analysis will focus on two types of attacks, those that target the hash function (or the combination FormatC ∘ Hash), and those that target the partial Fourier transform $\mathcal{F}_\Omega$. Other attacks may be possible, and investigating them is an area for future work.

As our aim is to develop a practical quantum-resistant signature scheme, we will assume that the adversary has access to a quantum computer. Relatively little is known about the existence or non-existence of quantum algorithms for lattice problems, so our assumptions related to quantum computers will only address their ability to solve $k$-element black-box search problems in $\Theta(\sqrt{k})$ time.

5.1 Attacks on the hash function

The most obvious constraint on the security of the system comes from the entropy of $c$. An adversary who can find a Hash preimage of a particular $c$ can produce forgeries on structured messages from any user's public key. To do so, the adversary:

1. Chooses arbitrary $z$ and $c$ from the appropriate domains.
2. Computes $\widehat{g}|_\Omega = \widehat{z}|_\Omega - \widehat{f}|_\Omega \odot \widehat{c}|_\Omega$, where $\widehat{f}|_\Omega$ is the victim's public key.
3. Finds a preimage of $c$ in $\mathsf{Hash}(\widehat{g}|_\Omega, \cdot)$.

While attacks against specific hash functions can have arbitrarily low complexity, we will assume that a strong hash function is chosen, and only consider generic attacks. If the output of Hash is $r$ bits, a quantum adversary can find preimages in time $\Theta(2^{r/2})$. For $\kappa$-bit security, the range of FormatC ∘ Hash should produce an essentially uniform distribution on a set of cardinality $2^{2\kappa}$.

5.2 Attacks on the partial Fourier transform

An adversary who can find $\mathcal{F}_\Omega$ preimages which are in $\mathcal{B}^\infty(k-b)$ can forge signatures on arbitrary messages from any user's public key.

1. Adversary chooses random point $g_F$ in $\mathcal{B}^\infty(k)$
2. $c_F = \mathsf{FormatC}(\mathsf{Hash}(\mathcal{F}_\Omega g_F, \mu))$
3. $\widehat{z_F}|_\Omega = \widehat{g_F}|_\Omega + \widehat{f}|_\Omega \widehat{c_F}|_\Omega$
4. Adversary uses preimage attack on $\widehat{z_F}|_\Omega$ to find appropriate $z_F$.

Adversaries could also try to recover the secret key directly with their preimage algorithm, but in order for this to be effective they must be able to find exceptionally short preimages. The problem of secret key recovery seems, at least intuitively then, to be harder than forgery. Yet, surprisingly, given the particular parameters of the scheme, lattice attacks may be better suited for solving the secret key recovery problem than they are for forging messages. Some care must be taken when choosing parameters to balance the difficulty of the two problems.

Lattice attacks on $\mathcal{F}_\Omega$ As mentioned briefly in the introduction, the partial Fourier recovery problem can easily be seen to be no harder than a specific class of closest vector problem CVP. Presented with the evaluation set, $\Omega$, and a partial Fourier representation $\hat{z}|_\Omega$, an adversary can construct a lattice in which solving the CVP associated to any arbitrary preimage of $\hat{z}|_\Omega$ allows them to construct a short preimage of $\hat{z}|_\Omega$.

That lattice, which we denote $\Lambda^\perp(\mathcal{F}_\Omega)$, is equivalent to the kernel of $\mathcal{F}_\Omega$, $$\Lambda^\perp(\mathcal{F}_\Omega) = \left\{ a \in \mathbb{Z}_q^N \ : \ \mathcal{F}_\Omega a = 0 \pmod q \right\}.$$

In practice, CVP instances are almost always solved by transforming the problem into an SVP in dimension $N+1$. If $z'$ is an arbitrary preimage of the target $\hat{z}|_\Omega$, i.e. $\mathcal{F}_\Omega z' = \hat{z}|_\Omega$ but $\|z'\|$ is large, and $\{b_1, b_2, \ldots, b_m\}$ form a Hermite Normal Form basis for $\Lambda^\perp(\mathcal{F}_\Omega)$, then solving SVP in the lattice generated by the columns of $$\mathcal{L}_{z'}^{\mathsf{SVP}} = \begin{pmatrix} q & 0 & b_{1,0} & \ldots & b_{m,0} & z'_0 \\ \ddots & & \vdots & \ddots & \vdots & \vdots \\ 0 & q & b_{1,t-1} & \ldots & b_{m,t-1} & z'_{t-1} \\ 0 \ldots 0 & & \vdots & \ddots & \vdots & \vdots \\ \vdots & \ddots & \vdots & b_{1,N-1} & \ldots & b_{m,N-1} & z'_{N-1} \\ 0 \ldots 0 & 0 & \ldots & 0 & 1 \end{pmatrix}$$

is likely to yield a short $z$ such that $\mathcal{F}_\Omega z = \hat{z}|_\Omega$.

Experiments by Micciancio and Regev [18] have demonstrated that lattice reduction algorithms perform best against the kernel lattices, $\Lambda^\perp(A)$, of $t \times N$ matrices $A$ when $N \approx \sqrt{t\log(q)/\log(\gamma)}$ for some $\gamma \approx 1.01$ determined experimentally for each reduction algorithm. In the PASS$_{\mathsf{RS}}$ setting this places restrictions on $t$ and $q$ that we have obeyed in all of our proposed parameter sets. As such there should be no benefit to attacking a sublattice of $\mathcal{L}^{\mathsf{SVP}}$, and we proceed under this assumption.

The performance of lattice reduction algorithms, particularly LLL and BKZ, on lattices such as $\mathcal{L}_{z'}^{\mathsf{SVP}}$ is difficult to analyze in practice. Perhaps the most surprising complicating factor is that the performance depends crucially on the coset of $\mathbb{Z}_q^N/\Lambda^\perp(\mathcal{F}_\Omega)$ to which $z'$ belongs, and not strongly on $z'$ itself. This dependence gives rise to two regimes that we will analyze separately. The extreme case, when $z'$ is very close to the kernel lattice, produces instances of the UniqueSVP problem and determines the difficulty of the secret key recovery problem in PASS$_{\mathsf{RS}}$. The average case produces instances of ApproxSVP which will inform our discussion of the signature forgery problem.

UniqueSVP is the problem of finding a shortest vector in a lattice that is known to have a significant gap between the lengths of its first and second successive minima. Such is the case[5] in the lattices $\mathcal{L}_f^{\mathsf{SVP}}$, as the the secret key, $f$, has an expected norm of $\sqrt{2N/3}$ and $[f, 1]^T \in \mathcal{L}_f^{\mathsf{SVP}}$.

---
[5] Curiously, the fact that the kernel lattice always contains the exceptionally short vector $[1, 1, \ldots, 1]$ seems to have no impact here.

Lattice reduction algorithms can be ranked according to the so-called Hermite factor that they achieve. Algorithms that achieve Hermite factor $\gamma$ can be expected to find the shortest vector in a lattice when the UniqueSVP-gap, $\lambda_2(\mathcal{L})/\lambda_1(\mathcal{L})$, is greater than a constant fraction of $\gamma$. This behavior was first examined by Gama and Nguyen, whose experiments determined that for a certain class of random lattices the constant is approximately 0.48 [5]. They exhibited classes of lattices for which the constant was smaller, but these appear to be somewhat exceptional. Ducas et al. [4] performed similar experiments on the lattices that occur in BLISS, and found the constant again to be 0.48, and we have found the same to be true of the lattices related to $PASS_{RS}$.

Table 2 contains estimates on the Hermite factor needed to recover $PASS_{RS}$ secret keys at several concrete parameter levels. We estimate $\lambda_2(\mathcal{L}_{f'}^{SVP})$ by the Gaussian heuristic in the $L^2$ norm. This predicts that $N$ successive minima of a lattice will be tightly clustered around the radius of the smallest $N$-ball that has volume equal to the determinant of the lattice. The $q$-ary lattices, $\Lambda^{\perp}(\mathcal{F}_{\Omega})$, have determinant $q^t$, and the Gaussian heuristic therefore predicts $$\lambda_2(\mathcal{L}_{f'}^{SVP}) = \lambda_1(\Lambda^{\perp}(\mathcal{F}_{\Omega})) \approx \det(\Lambda^{\perp}(\mathcal{F}_{\Omega}))^{1/N} \sqrt{\tfrac{N}{2\pi e}} = q^{t/N} \sqrt{\tfrac{N}{2\pi e}}.$$

As mentioned above, we estimate $\lambda_1$ as $\sqrt{2N/3}$, the length of the secret key. This gives us a UniqueSVP-gap, $\lambda_2/\lambda_1 \approx q^{t/N}\sqrt{3/(4\pi e)}$. Incorporating the constant 0.48 adjustment, we find that lattice reduction algorithms must achieve Hermite factor $$\gamma = 0.62 \cdot q^{t/N} \tag{1}$$

in order to recover $PASS_{RS}$ secret keys.

The analysis for forgery attacks is very similar, only now the target $\hat{z}|_{\Omega}$ will lie in an essentially random coset of $\mathbb{Z}_q^N/\Lambda^{\perp}(\mathcal{F}_{\Omega})$. The relevant problem is now ApproxSVP$_\alpha$ the problem of finding a short vector that is more than $\alpha$ factor of being optimal, in other words a vector that is no longer than $\alpha\lambda_1(\mathcal{L}_{z'}^{SVP})$. Lattice reduction algorithms that achieve Hermite factor $\gamma$ can solve ApproxSVP with factor $\alpha = \gamma^2$ in the worst case. That said, $\alpha = \gamma$ seems achievable on average [5], so we use this estimate in our analysis.

$PASS_{RS}$ signatures are validated by the $L^\infty$ norm, but lattice reduction algorithms typically only guarantee the $L^2$ norm of their results. A vector of $L^2$ norm $\sqrt{N} \cdot (k-b)$ could potentially serve as a forgery, but this is highly unlikely. We estimate the approximation factor to be the ratio of the expected length of a forgery to the volume of the lattice, which is $$\alpha = \sqrt{N} \cdot V/q^{t/N}, \tag{2}$$

where $V$ is the variance of the discrete uniform distribution on $[-k+b, k-b]$.

Concrete performance of lattice reduction algorithms Current folklore is that lattice reduction algorithms can achieve Hermite factor $\approx 1.01^N$ in reasonable time but that Hermite factor $1.005^N$ is completely out of reach. These are useful heuristics, but they reflect more our ignorance about the concrete performance of lattice reduction and enumeration algorithms than they do our knowledge. Unfortunately, it seems that we know far too little about how these algorithms perform in high dimension to give precise "bit-security" estimates. We can, however, roughly determine which of the currently available lattice reduction algorithms might be useful for attacking $PASS_{RS}$.

Experiments by Schneider and Buchmann [21] indicate that the Hermite factor reachable by BKZ with blocksize $\beta$ is approximately:

$$1.01655 - 0.000196185 \cdot \beta,$$

which for Hermite factors relevant to our parameter sets yields:

| Blocksize ($\beta$) | 15 | 30 | 40 | 55 |
|---|---|---|---|---|
| Root Hermite factor | 1.0136 | 1.0107 | 1.0087 | 1.0058 |

Table 2 lists several $PASS_{RS}$ parameter sets, the line labeled "Lattice security factor" represents our best guess as to the Hermite factor needed to launch either a key recovery or forgery attack (whichever is easier). We expect that our toy parameter set, $N = 433$, could be defeated by running BKZ-15 to completion. Although we do not have a good estimate on how long this would take, it should be possible with current technology.

Our other parameter sets should be significantly more difficult to attack. While Hermite factor $1.01^N$ is nominally within reach of today's technology, this has only been verified in relatively small dimensions. We know very little about how the algorithms will perform in dimension 577. Key recovery attacks on this parameter set should be possible with BKZ-30, but other approaches are likely needed to make the attack practical.

Chen and Nguyen have had impressive success with their BKZ-2.0 algorithm [3], which combines extreme pruning, developed in [6], with an early termination procedure, theoretically justified by [11]. BKZ-2.0 runs BKZ at phenomenally high blocksizes for a small number of rounds under the experimentally justified belief that most of the progress of BKZ is made in the early rounds. It is difficult to extrapolate security estimates from the results published thus far on BKZ-2.0's performance, but it would appear that our 577, 769, and 1153 parameter sets could be within reach of terminated BKZ-75, 122, and 229 respectively.

For $N = 577$, our experiments with a BKZ-2.0 simulator similar to that presented in [3] indicate that 56 rounds of BKZ-75 would be sufficient to reach root hermite factor 1.0106; for $N = 769$, 47 rounds of BKZ-122 would suffice to reach 1.0084; and for $N = 1153$, 42 rounds of BKZ-229 would reach 1.0058.

Following the analysis of [3], we expecte enumeration to be the most expensive subroutine of BKZ-2.0. Each round consists of approximately $N$ enumerations, and the cost of each enumeration depends on the the number of nodes visited in the enumeration tree. The estimated bit security is $$\log_2(N \cdot rounds) + \log_2(nodes\ per\ enumeration) + \log_2(cost\ per\ node)$$

Using number-of-node and cost-per-node estimates from [3], we have that the estimated security of our $N = 769$ parameter is $\log_2(769 \cdot 47) + 53 + \log_2(200) \approx 76$ bits.

For $N = 1153$, a single enumeration in BKZ-229 is expected to take over $2^{130}$ time, which is greater than the expected time for a quantum attack on the hash function.

| $N$ | 433 | 577 | 769 | 1153 |
|---|---|---|---|---|
| $q$ | 775937 | 743177 | 1047379 | 968521 |
| $g$ | 268673 | 296108 | 421722 | 56574 |
| $k$ | $2^{12}-1$ | $2^{14}-1$ | $2^{15}-1$ | $2^{15}-1$ |
| $b$ | 19 | 24 | 29 | 36 |
| $t$ | 200 | 280 | 386 | 600 |
| Pr [Accept] | 0.78 | 0.57 | 0.49 | 0.72 |
| UniqueSVP gap | 1.0117 | 1.0093 | 1.0075 | 1.0052 |
| ApproxSVP factor | 1.0105 | 1.0101 | 1.0081 | 1.0054 |
| Lattice security factor | 1.0134 | 1.0106 | 1.0084 | 1.0058 |
| Entropy of c | 124 | 160 | 200 | 260 |
| Bit-security bound | $\ll 62$ | $\ll 80$ | $< 100$ | $\leq 130$ |

Table 2: Parameter sets and security indicators. UniqueSVP gap refers to $\lambda_2/\lambda_1$ without any correction for the performance of specific lattice reduction algorithms.

6  Reference Implementation

We have created a reference implementation of $PASS_{RS}$ in C and made it available[6] under the GNU General Public License. Table 3 gives some idea of the performance of $PASS_{RS}$ relative to the recent proposal of Ducas et al. (BLISS [4]) and to RSA and ECDSA. BLISS was tested using the June 13, 2013 version[7]. The implementations of RSA and ECDSA are from OpenSSL 1.0.1e. All benchmarks were run on a single 2.8GHz core of an Intel Core i7-2640M with hyper threading and turbo boost disabled. We make no claims as to the accuracy of these benchmarks - the timing methods used internally by the three libraries tested are incommensurate and many variables have been left uncontrolled. However, we do feel that these preliminary performance estimates are worth reporting, as they indicate that the schemes are competitive with each other and that further comparisons would be interesting.

---

[6] https://github.com/NTRUOpenSourceProject/ntru-crypto
[7] http://bliss.di.ens.fr/

6.1 Performance considerations

The two most computationally intensive parts of $\text{PASS}_{\text{RS}}$ are the number theoretic transforms (NTT) used to compute $\mathcal{F}_\Omega$, and the sparse cyclic convolution used in computing $z = f \star c + y$. To compute $\mathcal{F}_\Omega$ we use Rader's algorithm to decompose the prime length NTT into cyclic convolution of length $N - 1$. We compute the resulting convolution as a pair of Fourier transforms over $\mathbb{C}$ using version 3.3.3 of FFTW. For all of the parameter sets presented above we have chosen chosen $N$ to be a Pierpont prime (a prime of the form $2^u \cdot 3^v + 1$) as these yield very fast Fourier transform algorithms. Fermat primes ($2^u + 1$) would yield a faster transforms, but there are no Fermat primes in our preferred parameter range.

We have made little effort to optimize the computation of sparse convolutions, and these often dominate the running time of the signing process.

6.2 Concrete instantiations of public functions

Our reference implementation uses SHA-512 to instantiate Hash for all parameter sets. The input passed to SHA-512 is the concatenation of the low order byte of each coefficient of $\widehat{y}|_\Omega$ followed by the SHA-512 digest of $\mu$.

$$\text{Hash}(\widehat{y}, \mu) = \text{SHA-512}(lowbyte(\widehat{y}_0) \mid \ldots \mid lowbyte(\widehat{y}_{t-1}) \mid \text{SHA-512}(\mu))$$

We have not implemented any message padding.

Our instantiation of FormatC sets aside the first 64 bits of $h_0 = \text{Hash}(\widehat{y}|_\Omega, \mu)$ to use as signs of the nonzero coefficients of $c$. The remaining bits of $h_0$ are used, 16 at a time, in a rejection sampling procedure to generate uniform random values in the interval $[0, N-1]$. Each such value becomes the index of a non-zero coefficient of $c$. If the pool of bits is ever exhausted, the process continues on $h_i = \text{SHA-512}(h_{i-1})$.

The random coefficients of $y$ are generated by a rejection sampling procedure on the output of a stream cipher. Specifically we use the procedure from [10] of keying the Salsa20 stream cipher with a short seed from the Linux kernel random number generator.

| Parameter Set | Sign | | Verify | |
|---|---|---|---|---|
| | Median | Average | Median | Average |
| 577 | 121996 | 171753 | 86828 | 87031 |
| 769 | 174900 | 205456 | 120204 | 120374 |
| 1153 | 421904 | 584230 | 172428 | 172641 |

Table 4: Sandy Bridge cycle counts for $\text{PASS}_{\text{RS}}$. 100k samples

| Algorithm | Parameter Set | Sign (µs) | Verify (µs) | Sig. (bytes) | Pub. key (bytes) |
|---|---|---|---|---|---|
| PASS$_{RS}$ | 577 | 62 | 31 | 1115 | 700 |
| | 769 | 73 | 40 | 1578 | 965 |
| | 1153 | 203 | 69 | 2360 | 1500 |
| BLISS | 0 | 321 | 25 | 413 | 413 |
| | I | 164 | 44 | 700 | 875 |
| | II | 642 | 43 | 625 | 875 |
| | III | 270 | 45 | 750 | 875 |
| | IV | 496 | 47 | 813 | 875 |
| RSA | 1024 | 225 | 15 | 128 | 128 |
| | 2048 | 1591 | 50 | 256 | 256 |
| | 4096 | 11532 | 185 | 512 | 512 |
| ECDSA | secp160r1 | 80 | 270 | 40 | 20 |
| | nistp256 | 146 | 348 | 64 | 32 |
| | nistp384 | 268 | 1151 | 96 | 48 |

Table 3: Benchmarks. Times are averages over many operations.

References

1. Ajtai, M.: Generating hard instances of lattice problems (extended abstract). In: Proceedings of the twenty-eighth annual ACM symposium on theory of computing. pp. 99–108. STOC 1996, ACM (1996)
2. Candes, E., Romberg, J., Tao, T.: Robust uncertainty principles: exact signal reconstruction from highly incomplete frequency information. IEEE Transactions on Information Theory 52(2), 489–509 (2006)
3. Chen, Y., Nguyen, P.Q.: BKZ 2.0: Better lattice security estimates. In: ASIACRYPT 2011, pp. 1–20. Springer (2011)
4. Ducas, L., Durmus, A., Lepoint, T., Lyubashevsky, V.: Lattice signatures and bimodal gaussians. In: Canetti, R., Garay, J.A. (eds.) CRYPTO 2013, LNCS, vol. 8042, pp. 40–56. Springer (2013)
5. Gama, N., Nguyen, P.Q.: Predicting lattice reduction. In: Smart, N. (ed.) EUROCRYPT 2008, LNCS, vol. 4965, pp. 31–51. Springer (2008)
6. Gama, N., Nguyen, P.Q., Regev, O.: Lattice enumeration using extreme pruning. In: EUROCRYPT 2010. LNCS, vol. 6110, pp. 257–278. Springer (2010)
7. Gentry, C., Peikert, C., Vaikuntanathan, V.: Trapdoors for hard lattices and new cryptographic constructions. In: Proceedings of the 40th annual ACM symposium on theory of computing. pp. 197–206. STOC 2008, ACM (2008)
8. Gentry, C., Szydlo, M.: Cryptanalysis of the revised NTRU signature scheme. In: Knudsen, L.R. (ed.) EUROCRYPT 2002, LNCS, vol. 2332, pp. 299–320. Springer (2002)
9. Güneysu, T., Lyubashevsky, V., Pöppelmann, T.: Practical lattice-based cryptography: A signature scheme for embedded systems. In: Prouff, E., Schaumont, P. (eds.) CHES 2012, LNCS, vol. 7428, pp. 530–547. Springer (2012)
10. Güneysu, T., Oder, T., Pöppelmann, T., Schwabe, P.: Software speed records for lattice-based signatures. In: Post-Quantum Cryptography. LNCS, vol. 7932, pp. 67–82. Springer (2013)

11. Hanrot, G., Pujol, X., Stehlé, D.: Analyzing blockwise lattice algorithms using dynamical systems. In: Rogaway, P. (ed.) CRYPTO 2011, LNCS, vol. 6841, pp. 447–464. Springer (2011)
12. Hoffstein, J., Kaliski, B.S.J., Lieman, D.B., Robshaw, M.J.B., Yin, Y.L.: Secure user identification based on constrained polynomials (2000), U.S. Classification: 713/168; 380/28; 380/30; 713/170; 713/176 International Classification: H04L 932; H04L 928; H04L 930
13. Hoffstein, J., Silverman, J.H.: Polynomial rings and efficient public key authentication II. In: Lam, K.Y., Shparlinski, I., Wang, H., Xing, C. (eds.) Cryptography and Computational Number Theory, Progress in Computer Science and Applied Logic, vol. 20, pp. 269–286. Birkhäuser (2001)
14. Lyubashevsky, V.: Lattice-based identification schemes secure under active attacks. In: Cramer, R. (ed.) PKC 2008, LNCS, vol. 4939, pp. 162–179. Springer (2008)
15. Lyubashevsky, V.: Fiat-shamir with aborts: Applications to lattice and factoring-based signatures. In: ASIACRYPT 2009, pp. 598–616. Springer (2009)
16. Lyubashevsky, V.: Lattice signatures without trapdoors. In: Pointcheval, D., Johansson, T. (eds.) EUROCRYPT 2012, LNCS, vol. 7237, pp. 738–755. Springer (2012)
17. Lyubashevsky, V., Micciancio, D.: Generalized compact knapsacks are collision resistant. In: Bugliesi, M., Preneel, B., Sassone, V., Wegener, I. (eds.) Automata, Languages and Programming, LNCS, vol. 4052, pp. 144–155. Springer (2006)
18. Micciancio, D., Regev, O.: Lattice-based cryptography. In: Bernstein, D.J., Buchmann, J., Dahmen, E. (eds.) Post-Quantum Cryptography, pp. 147–191. Springer (2009)
19. Nguyen, P.: Cryptanalysis of the Goldreich-Goldwasser-Halevi cryptosystem from CRYPTO97. In: Wiener, M. (ed.) CRYPTO 1999, LNCS, vol. 1666, pp. 288–304. Springer (1999)
20. Peikert, C., Rosen, A.: Efficient collision-resistant hashing from worst-case assumptions on cyclic lattices. In: Halevi, S., Rabin, T. (eds.) Theory of Cryptography, LNCS, vol. 3876, pp. 145–166. Springer (2006)
21. Schneider, M., Buchmann, J.: Extended lattice reduction experiments using the BKZ algorithm. In: Sicherheit, LNI, vol. 170, pp. 241–252. Gesellschaft für Informatik (2010)

The invention claimed is:

1. A method for signing and subsequently verifying a digital message, comprising the following steps implemented using at least one processor-based subsystem:
   selecting parameters that include first and second primes, a ring of polynomials related to said primes, and first and second range-defining integers;
   deriving private and public keys respectively related to a random polynomial private key of the ring of polynomials, and to evaluations of roots of unity of the random polynomial to obtain a public key set of integers;
   storing the private key and publishing the public key;
   signing the digital message by: (A) generating a noise polynomial, (B) deriving a candidate signature by obtaining a hash of the digital message and the public key evaluated at the noise polynomial, and determining the candidate signature using the private key, a polynomial derived from the hash, and the noise polynomial, (C) determining whether the coefficients of the candidate signature are in a predetermined range dependent on said first and second range-defining integers, and (D) repeating steps (A) through (C) until the criterion of step (C) is satisfied, and outputting the resultant candidate signature in electronic form as an encoded signed message; and
   performing a verification procedure utilizing the encoded signed message and the public key to determine whether the encoded signed message is valid and outputting, in electronic form, an indication of validity or invalidity.

2. The method as defined by claim 1, further comprising transmitting the encoded signed message, and wherein said step of performing a verification procedure includes receiving the transmitted message and performing the verification procedure on the received message.

3. The method as defined by claim 2, wherein said digital message comprises a challenge communication from a verifier entity, and wherein said encoded signed message is transmitted to said verifier entity.

4. The method as defined by claim 1, wherein said first and second range-defining integers define norm bound ranges, and wherein said step of determining whether the coefficients of the candidate signature are in a predetermined range comprises determining whether said coefficients are within a range dependent on a difference between the norm bound ranges.

5. The method as defined by claim 4, wherein said first and second range-defining integers respectively comprise an integer k, which is the infinity-norm of the noise polynomial, and an integer b, which is the 1-norm of the noise polynomial, and wherein said step of determining whether the coefficients of the candidate signature are in a predetermined range comprises determining whether said coefficients are within the range −(k-b) to (k-b).

6. A method for signing and subsequently verifying a number of digital messages in a manner which protects against a transcript attack, comprising the following steps implemented using at least one processor-based subsystem:
   selecting parameters that include first and second primes, a ring of polynomials related to said primes, and first and second range-defining integers;
   deriving private and public keys respectively related to a random polynomial private key of the ring of polynomials, and to evaluations of roots of unity of the random polynomial to obtain a public key set of integers;
   storing the private key and publishing the public key;
   signing each of the digital messages by: (A) generating a noise polynomial, (B) deriving a candidate signature by obtaining a hash of the digital message and the public key evaluated at the noise polynomial, and determining the candidate signature using the private key, a polynomial derived from the hash, and the noise polynomial, (C) determining whether the coefficients of the candidate signature are in a predetermined range dependent on said first and second range-defining integers, and (D) repeating steps (A) through (C) until the criterion of step (C) is satisfied, and outputting the resultant candidate signature in electronic form as an encoded signed message; and
   performing a verification procedure for each encoded signed message by utilizing the encoded signed message and the public key to determine whether the encoded signed message is valid and outputting, in electronic form, an indication of validity or invalidity;
   whereby a transcript of said encoded signed messages does not reveal information about the private key polynomial.

7. The method as defined by claim 6, further comprising transmitting the encoded signed messages, and wherein said step of performing a verification procedure includes receiving the transmitted messages and performing the verification procedure on the received messages.

8. The method as defined by claim 6, wherein said first and second range-defining integers define norm bound ranges, and wherein said step of determining whether the coefficients of each candidate signature are in a predetermined range comprises determining whether said coefficients are within a range dependent on a difference between the norm bound ranges.

9. The method as defined by claim 6, wherein said first and second range-defining integers respectively comprise an integer k, which is the infinity-norm of the noise polynomial, and an integer b, which is the 1-norm of the noise polynomial, and wherein said step of determining whether the coefficients of the candidate signatures are in a predetermined range comprises determining whether said coefficients are within the range −(k-b) to (k-b).

* * * * *